United States Patent
Tombers et al.

(10) Patent No.: US 6,499,969 B1
(45) Date of Patent: Dec. 31, 2002

(54) CONICALLY JOINTED TURBOCHARGER ROTOR

(75) Inventors: Michael Dean Tombers, Lockport, IL (US); John R. Zagone, Westmont, IL (US); James William Heilenbach, Riverside, IL (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/567,878

(22) Filed: May 10, 2000

(51) Int. Cl.[7] .................................................. F04B 17/00
(52) U.S. Cl. ................ 417/407; 416/244 A; 416/244 R; 416/204 A
(58) Field of Search ....................... 417/407; 416/241 B, 416/244 A, 244 R, 204 A

(56) References Cited

U.S. PATENT DOCUMENTS

| | | | |
|---|---|---|---|
| 3,019,039 A | | 1/1962 | Clavell .................... 416/244 A |
| 4,424,003 A | | 1/1984 | Brobeck .................. 416/241 B |
| 4,538,969 A | * | 9/1985 | Ammann et al. ............ 417/407 |
| 4,639,194 A | | 1/1987 | Bell, III et al. ........... 416/241 B |
| 4,747,722 A | * | 5/1988 | Kawaguchi et al. ..... 416/241 B |
| 4,784,574 A | * | 11/1988 | Tsuno et al. ............. 416/244 A |
| 4,786,238 A | * | 11/1988 | Glasser et al. ........... 416/244 A |
| 4,820,128 A | * | 4/1989 | Ito ........................... 416/241 B |
| 4,915,589 A | | 4/1990 | Gessler et al. ........... 416/241 B |
| 4,983,064 A | * | 1/1991 | Kawaguchi et al. ..... 416/244 A |
| 5,089,312 A | * | 2/1992 | Kawase et al. .......... 416/244 A |
| 5,131,782 A | | 7/1992 | Bruno et al. ............. 416/244 A |
| 5,178,519 A | * | 1/1993 | Kawasaki et al. ....... 416/241 B |
| 5,961,247 A | | 10/1999 | Gold et al. |
| 6,017,184 A | | 1/2000 | Aguilar et al. ............... 417/407 |
| 6,368,077 B1 | * | 4/2002 | Meyerkord et al. ......... 417/407 |

FOREIGN PATENT DOCUMENTS

| | | | |
|---|---|---|---|
| DE | 36 25 996 A1 | * 7/1986 | ............. 416/241 B |
| DE | 44 13 101 A1 | * 10/1995 | |
| DE | 4445296 C1 | 8/1996 | |
| GB | 1 422 426 | 1/1976 | |

* cited by examiner

*Primary Examiner*—Thomas Denion
*Assistant Examiner*—Thai-Ba Trieu
(74) *Attorney, Agent, or Firm*—Cary W. Brooks

(57) ABSTRACT

A turbocharger rotor includes a turbine wheel, a compressor wheel, a shaft extending between the turbine and compressor wheels for rotation together about an axis, and connecting means including two pairs of non-locking cones. In a preferred embodiment, the cones include external cones on the turbine and compressor wheels and internal cones on the ends of the shaft. The non-locking cones are centered on the axis with the external and internal cones drivingly engaging one another to align and connect the wheels with the shaft. A long bolt fastener extends through the compressor wheel and the shaft to engage the turbine wheel and hold the rotor components in assembly. An alternative embodiment includes engaging radial surfaces outward of the cones. The radial surfaces share the transmission of torque through the connecting means and assist in stabilizing the joints between the shaft and the connected wheels. Additional features are disclosed.

17 Claims, 4 Drawing Sheets

CONICALLY JOINTED TURBOCHARGER ROTOR

TECHNICAL FIELD

This invention relates to engine exhaust driven turbochargers and more particularly to a conically jointed rotor for a turbocharger.

BACKGROUND OF THE INVENTION

It is known in the art relating to exhaust driven engine turbochargers to provide a rotor including a turbine wheel and a compressor wheel connected by a shaft for rotation together about an axis. Various types of connecting means have been provided for aligning and connecting the wheels and the shaft for axial rotation. The connecting means for the compressor impeller wheel and the turbine wheel relative to the shaft are important because the rotor must be disassembled after balancing in order to assemble the rotor into the turbocharger. Upon reassembly of the rotor, the repeat balance must preserve the original balance as far as possible without actually rebalancing the rotor in the turbocharger assembly. Connecting means that allow separation and reassembly of the components without changing the balance are therefore desired.

SUMMARY OF THE INVENTION

The present invention provides novel connecting means for aligning or centering the compressor and turbine wheels on the axis of the connecting shaft with the capability of simple and repeatable reassembly. The connecting means include two pairs of non-locking cones, one pair connecting each of the wheels with the shaft. Each of the cone pairs has an external cone and an internal cone, both centered on the axis and drivingly engaging one another. In preferred embodiments, the external cones are connected with the wheels and the internal cones are formed in the connecting shaft. The external cones may be integral with an adapter fixed, for example, to the aluminum compressor wheel, or they may be formed integral with the wheel, as is the case with the high temperature turbine wheel. The adapter or a separate sleeve may provide an oil sealing surface. The shaft includes spaced bearing journals for supporting the rotor and at least one thrust reaction surface for axially positioning the rotor. The rotor elements are held in assembly by a threaded bolt that extends through the compressor wheel and the shaft and engages threads in the turbine wheel cone portion. Alternative securing arrangements may be provided if desired.

Alternative embodiments of connecting means combine the non-locking cones with radially engaging shoulders and abutments that share the torque transmitting loads with the non-locking cones and provide additional rotational stability.

These and other features and advantages of the invention will be more fully understood from the following description of certain specific embodiments of the invention taken together with the accompanying drawings.

DESCRIPTION OF THE PREFERRED EMBODIMENT

Figure 1:
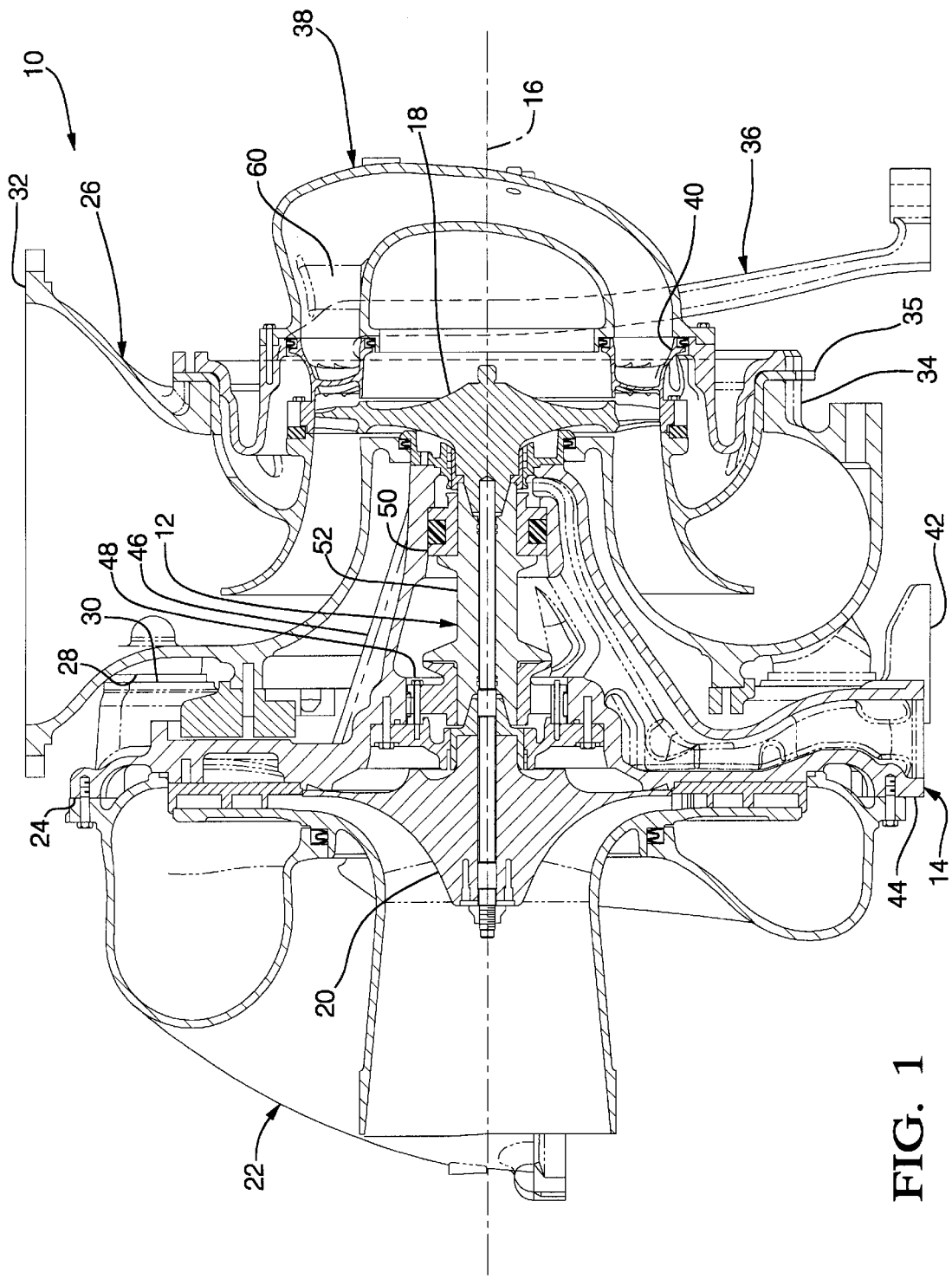
FIG. 1 is a cross-sectional view of an engine turbocharger having rotor connecting means in accordance with the invention.

Referring now to the drawings in detail, numeral 10 generally indicates an exhaust driven turbocharger for an engine, such as a diesel engine intended for use in railway locomotives or other applications of medium speed diesel engines. Turbocharger 10 includes a rotor 12 carried by a rotor support 14 for rotation on a longitudinal axis 16 and including a turbine wheel 18 and a compressor wheel 20. The compressor wheel is enclosed by a compressor housing assembly 22 including components which are supported on an axially facing first side 24 of the rotor support 14. An exhaust duct 26 has a compressor end 28 that is mounted on a second side 30 of the rotor support 14 spaced axially from the first side 24.

The exhaust duct 26 is physically positioned between the rotor support 14 and the turbine wheel 18 to receive exhaust gases passing through the turbine wheel and carry them to an exhaust outlet 32. A turbine end 34 of the exhaust duct 26 and an associated nozzle retainer assembly 35 are separately supported by an exhaust duct support 36 that is connected with the exhaust duct 26 at the turbine end 34. The exhaust duct support 36 also supports a turbine inlet scroll 38 which receives exhaust gas from the associated engine and directs it through a nozzle ring 40 to the turbine wheel 18 for transferring energy to drive the turbocharger compressor wheel 20.

The rotor support 14 includes a pair of laterally spaced mounting feet 42 which are rigidly connected to an upstanding mounting portion 44 of the rotor support 14 and are adapted to be mounted on a rigid base, not shown. The rotor support 14 further includes a tapering rotor support portion 46 having bearings 48, 50 that rotatably support the rotor 12. Bearing 48 is a combination sleeve and thrust bearing while bearing 50 is primarily a sleeve bearing.

Figure 2:
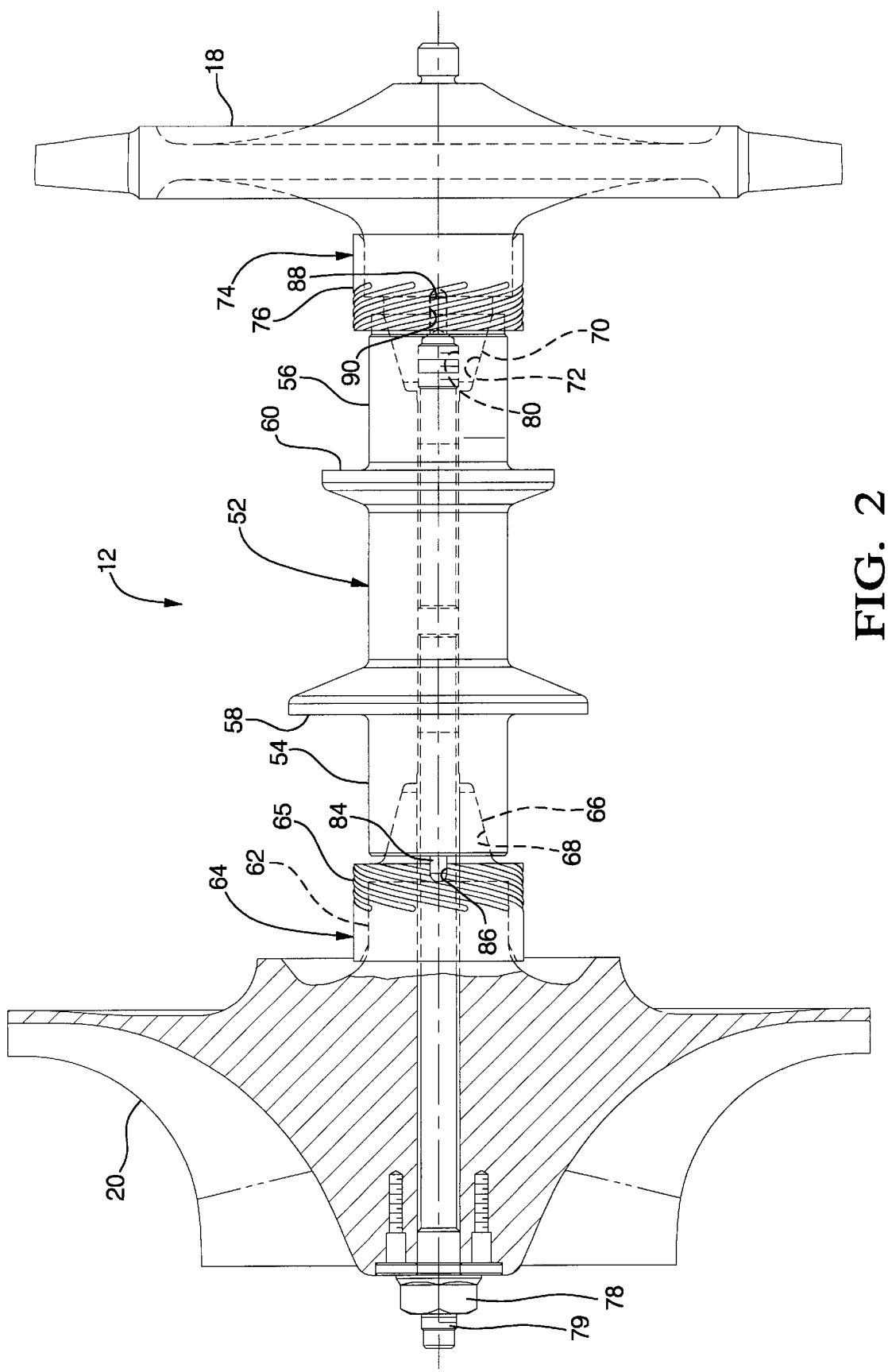
FIG. 2 is a side view of the rotor in the embodiment of FIG. 1.

Referring particularly to FIG. 2, the rotor 12 includes a shaft 52 connected with the turbine wheel 18 at one end and the compressor wheel 20 at the opposite end. The shaft 52 includes a pair of axially spaced bearing journals 54, 56 respectively adjacent the compressor and turbine wheel ends of the shaft. A flange, inboard of journal 54, carries a radial thrust reaction surface 58. A second flange adjacent journal 56 carries a radial surface 60. Journals 54, 56 are respectively supported in bearings 48, 50. Radial surface 58 carries thrust forces to the sleeve/thrust bearing 58 and radial surface 60 limits axial movement of the rotor.

In accordance with the invention, novel connecting means are provided for aligning and connecting the compressor and turbine wheels on their respective ends of the shaft 52. The aluminum alloy compressor wheel 20 includes an axially aligned cylindrical stub 62 on which is fixed an adapter 64 including an outer seal surface 65. For the compressor wheel, the connecting means comprise a pair of non-locking cones including an external cone 66 extending axially from the adapter 64 and engaging an internal cone 68 formed in the compressor end of the shaft 52.

For the turbine wheel 18, the connecting means include non-locking cones including an external cone 70 integral with and extending axially from the turbine wheel to engagement with an internal cone 72 formed in the turbine end of the shaft 52. A seal collar 74 fixed on the turbine wheel adjacent the cone 70 includes an outer seal surface 76. Alternatively, adapters could be used on either end of the shaft and/or the external cones could be formed on the shaft 52 while the internal cones would be formed in the wheels or adapters. Note that on both ends, the cones have an included cone angle of less than 90 degrees to remain within the dimensional constraints of the particular turbocharger embodiment illustrated.

The rotor elements are secured together by fastener means including a long stud 78 that extends through the compressor wheel 20 and shaft 52 to engage a threaded opening 80 in the external cone 70 of the turbine wheel 18. A nut 79 holds the non-locking cones in engagement to maintain the compressor and turbine wheels in axial alignment on the shaft 52.

Mechanical stops are preferably provided between the shaft and wheel elements of the rotor to allow assembly of the elements in predetermined angular relation. Any suitable forms of stops may be used. For example, at the compressor end, radial lugs 84 on the shaft 52 are received in radial slots or grooves 86 in the adapter 64 to insure a fixed angular phase relation of the compressor wheel and shaft. Similarly, at the turbine end, radial lugs 88 engage axial slots 90 in the collar 74

The rotor 12 is first assembled outside the turbocharger as shown in FIG. 2. It is balanced and subsequently disassembled for assembly with other components in the buildup of a complete turbocharger. Upon reassembly within the turbocharger, the rotor components are axially aligned by the non-locking cones and angularly positioned with the same phase angles maintained during balancing by the lugs 84, 88 and slots 86, 90 of the mechanical stops. The reassembled rotor is thus maintained in essentially the same balance condition as originally provided by the original balance operation outside of the turbocharger.

Figure 3:
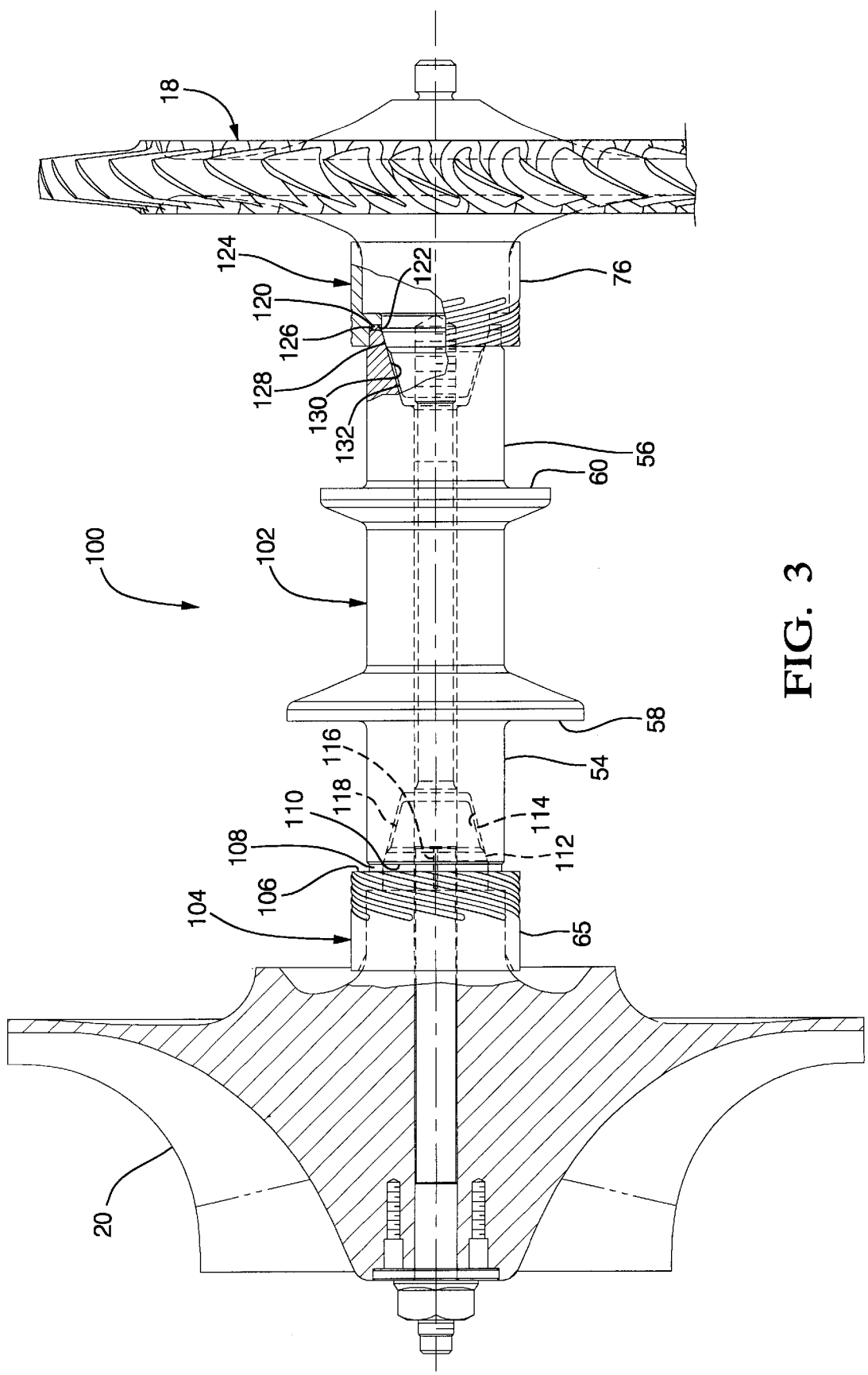
FIG. 3 is a side view of a rotor having an alternative embodiment of connecting means.

Referring now to FIG. 3 of the drawings wherein like numerals indicate like parts or features, numeral 100 indicates a turbocharger rotor having a modified form of connecting means according to the invention. The compressor wheel 20 and turbine wheel 18 are configured as before and many of the features of the shaft 102 are unchanged. However the compressor end adapter 104 includes a radial shoulder 106, which is engaged by a ring spacer 108. The spacer engages a radial abutment 110 of the shaft 102 to accept a portion of the rotational forces transmitted from the turbine to the compressor. The radial connection thus augments the cones 112, 114 both in force transmission and in providing additional stability to the assembled joint. Angular orientation is maintained in this embodiment by a pin 116 keying the adapter 104 to the shaft 102. If desired, end portions of the external cones 112 may be recessed as at annular recess 118 to limit the contact area of the cones to their large ends and provide the desired compressive and friction forces at the interfaces.

At the turbine end of the shaft 102, a ring spacer 120 is clamped between a radial shoulder 122 of the seal collar 124 and a radial abutment 126 of the shaft 102 to also accept a portion of rotational forces and add stability to the assembly. External and internal cones 128, 130 with an optional annular recess 132 are also provided as at the compressor end of the shaft 102. The adapter 104 and seal collar 124 are provided with outer seal surfaces 65, 76 as in the embodiment of FIG. 2. A pin or other angular orientation means, not shown, may be also used at this joint. The spacers 108, 120 may be used in both instances to selectively fit the joints to balance torsional loads between the cones and the radial surfaces in a desired manner. If sufficiently close tolerances can be maintained in production, the ring spacers may be omitted and the radial shoulders 106, 122 may directly engage the radial abutments. 110, 126.

Figure 4:
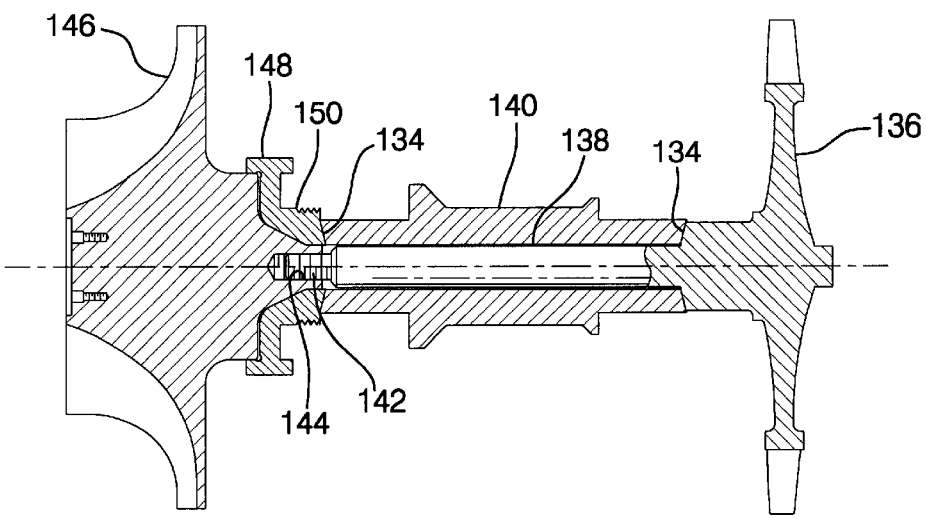
FIGS. 4–6 are side views of additional rotor embodiments having alternative connecting means and selected alternative securing means.
Figure 5:
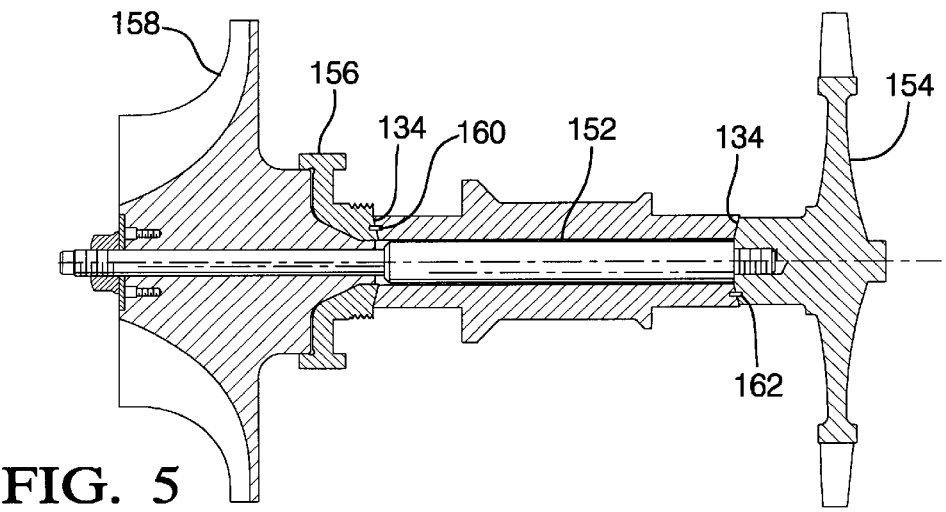
Figure 6:
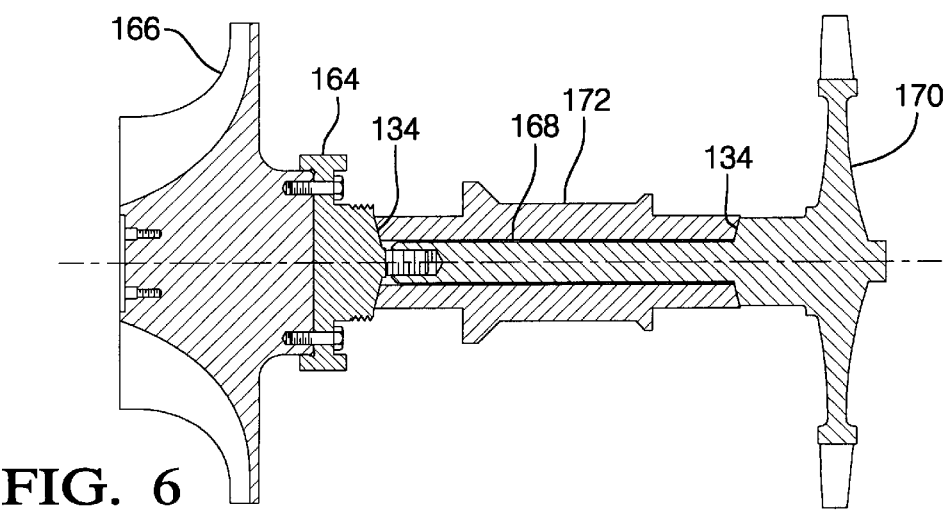

FIGS. 4–6 illustrate several of many possible alternative embodiments of turbocharger rotors with connecting and fastener means according to the invention. In each case note that non-locking cones 134 are employed which have included cone angles greater than 90 degrees.

In the embodiment of FIG. 4, a turbine wheel 136 includes an extended rod 138 that passes through the hollow journal shaft 140 and includes a threaded end 142 that engages a threaded bore 144 formed directly in the compressor wheel 146. An adapter 148 fixed on the compressor wheel provides a seal surface 150 and the external one of the non-locking cones. The turbine wheel 136 carries the external cone at the other end of the shaft 140.

In FIG. 5, a through stud 152 threadably engages the turbine wheel 154 similar to the embodiments of FIGS. 1–3. An adapter 156 is fixed on the compressor wheel 158 and pins 160, 162 are provided to rotationally orient the wheels 154, 158.

In FIG. 6, an adapter 164, fixed and bolted to the compressor wheel 166, is threaded into a rod 168 extending from the turbine wheel 170. Again the rod 168 extends through the hollow journal shaft 172.

The included cone angles of the non-locking cones of various embodiments may be greater or not greater than 90 degrees depending upon the rotational forces to be transmitted and the diameters of the connecting parts allowable for the specific application. However, the cone angles should be great enough at the low end to avoid self locking of the engaging cones and small enough at the high end to provide the desired centering action when the cones are engaged.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A rotor for an engine turbocharger including a turbine wheel, a compressor wheel, a shaft extending between the turbine and compressor wheels for rotation together about an axis, and connecting means comprising:

at least one pair of non-locking cones including an external cone and an internal cone both centered on the axis and drivingly engaging one another and each connected with one of said one of the wheels and the shaft; and fastener means holding the shaft and said one of the wheels together with the external cone received in the internal cone.

2. A rotor as in claim 1 wherein the external cone is connected with the compressor wheel and the internal cone is connected with the shaft.

3. A rotor as in claim 1 wherein the external cone is connected with the turbine wheel and the internal cone is connected with the shaft.

4. A rotor as in claim 1 wherein said connecting means align and connect both of the wheels with the shaft.

5. A rotor as in claim 4 wherein said connecting means include a pair of said non-locking cones between each of said wheels and the shaft.

6. A rotor as in claim 1 wherein the internal cone is integral with the shaft.

7. A rotor as in claim 1 wherein the external cone is integral with said one of the wheels.

8. A rotor as in claim 1 wherein the external cone is formed on an adapter connected with said one of the wheels.

9. A rotor as in claim 8 wherein the adapter includes a lubricant sealing surface.

10. A rotor as in claim 1 including a collar on said one of the wheels and providing a lubricant sealing surface.

11. A rotor as in claim 1 wherein the shaft includes spaced bearing journals for supporting the rotor.

12. A rotor as in claim 1 wherein the shaft includes a thrust reaction surface for axially positioning the rotor.

13. A rotor as in claim 1 wherein the non-locking cones each have a cone angle not greater than 90 degrees.

14. A rotor as in claim 1 wherein the non-locking cones each have a cone angle greater than 90 degrees.

15. A rotor as in claim 1 wherein the fastener means includes a threaded member extending from at least one of the wheels and engaging one of the shaft and the other of said wheels.

16. A rotor as in claim 1 including a radial shoulder on one of said non-locking cones and operatively engagable with a radial abutment on the other of said non-locking cones for stabilizing the connecting means and assisting in transmission of torque through the connecting means.

17. A rotor as in claim 16 including a spacer between the shoulder and the abutment.

* * * * *